(12) United States Patent
Lühmann et al.

(10) Patent No.: US 9,714,366 B2
(45) Date of Patent: *Jul. 25, 2017

(54) LINER FOR PROTECTION OF ADHESIVES

(71) Applicant: tesa SE, Hamburg (DE)

(72) Inventors: Bernd Lühmann, Norderstedt (DE); Klaus Keite-Telgenbüscher, Hamburg (DE); Minyoung Bai, Hamburg (DE); Thilo Dollase, Hamburg (DE)

(73) Assignee: tesa SE, Norderstedt (DE)

( * ) Notice: Subject to any disclaimer, the term of this patent is extended or adjusted under 35 U.S.C. 154(b) by 428 days.

This patent is subject to a terminal disclaimer.

(21) Appl. No.: 13/719,277

(22) Filed: Dec. 19, 2012

(65) Prior Publication Data

US 2013/0183471 A1    Jul. 18, 2013

(30) Foreign Application Priority Data

Dec. 22, 2011    (DE) ........................ 10 2011 089 566

(51) Int. Cl.
| | |
|---|---|
| *C09J 7/02* | (2006.01) |
| *C08K 3/10* | (2006.01) |
| *C08K 3/22* | (2006.01) |
| *C08K 3/30* | (2006.01) |
| *B01J 20/22* | (2006.01) |
| *B01J 20/04* | (2006.01) |
| *B01J 20/18* | (2006.01) |
| *G01D 7/00* | (2006.01) |

(52) U.S. Cl.
CPC ........... *C09J 7/0239* (2013.01); *C09J 7/0235* (2013.01); *G01D 7/005* (2013.01); *C09J 2400/163* (2013.01); *Y10T 156/10* (2015.01); *Y10T 428/1443* (2015.01); *Y10T 428/24997* (2015.04); *Y10T 428/31678* (2015.04)

(58) Field of Classification Search
None
See application file for complete search history.

(56) References Cited

U.S. PATENT DOCUMENTS

| | | | |
|---|---|---|---|
| 4,051,195 | A | 9/1977 | McWhorter |
| 4,502,903 | A | 3/1985 | Bruder |
| 4,552,004 | A | 11/1985 | Barfield et al. |
| 2003/0057574 | A1 | 3/2003 | Boroson et al. |
| 2004/0142495 | A1* | 7/2004 | Hartman et al. ............. 436/518 |
| 2004/0169174 | A1 | 9/2004 | Huh et al. |
| 2004/0216778 | A1 | 11/2004 | Ferri et al. |
| 2006/0100299 | A1 | 5/2006 | Malik et al. |
| 2006/0223903 | A1 | 10/2006 | Cao et al. |
| 2007/0166512 | A1* | 7/2007 | Jesch ................... B65D 81/264 428/138 |
| 2008/0145611 | A1* | 6/2008 | Mess et al. ................... 428/143 |
| 2011/0036496 | A1 | 2/2011 | Keite-Telgenbuscher et al. |
| 2011/0036623 | A1 | 2/2011 | Keite-Telgenbuscher et al. |
| 2011/0318548 | A1* | 12/2011 | Fedeli et al. ................. 428/196 |
| 2012/0231197 | A1* | 9/2012 | Mitchell ................... B32B 7/06 428/40.2 |

FOREIGN PATENT DOCUMENTS

| | | |
|---|---|---|
| CN | 1282770 A | 2/2001 |
| CN | 101151343 A | 3/2008 |
| CN | 101720278 A | 6/2010 |
| DE | 102009020004 A1 | 11/2010 |
| DE | 102009036968 A1 | 2/2011 |
| DE | 102009036970 A1 | 2/2011 |
| EP | 1072664 A1 | 1/2001 |
| EP | 1407818 A1 | 4/2004 |
| EP | 2078608 A1 | 7/2009 |
| JP | 2005298703 A | 10/2005 |
| WO | 9821287 A1 | 5/1998 |
| WO | 0034035 | 6/2000 |
| WO | 03002684 A1 | 1/2003 |
| WO | 2006036393 A2 | 4/2006 |
| WO | 2006107748 A1 | 10/2006 |
| WO | 2007087281 A1 | 8/2007 |
| WO | 2008036707 A2 | 3/2008 |
| WO | 2008072115 A1 | 6/2008 |
| WO | WO2008152182 A1 | 12/2008 |
| WO | 2009059299 A1 | 5/2009 |

OTHER PUBLICATIONS

A. Colas, Silicone Chemistry Overview Tech Paper, Dow Corning, pp. 1-12, 1997.
European Search Report for related European Application No. 12193853.4 dated Apr. 10, 2013.
English Language Translation of Chinese Office Action for related Chinese Application No. 201210567425.1 dated Aug. 14, 2015.
English Language Translation of Chinese Office Action for related Chinese Application No. 201280070423.X dated Apr. 29, 2015.
English Language Translation of Taiwanese Office Action for related Taiwan Application No. 101148304 dated Mar. 29, 2016.
English Language Translation of Chinese Office Action for related Chinese Application No. 201210567425.1 dated May 9, 2016.

* cited by examiner

*Primary Examiner* — Sheeba Ahmed
(74) *Attorney, Agent, or Firm* — Norris McLaughlin & Marcus, P.A.

(57) ABSTRACT

In the case of a liner for the protection of adhesives, the protective effect is to be enhanced in respect of permeates originating from the environment and also permeates included during winding or stacking and other processing steps. This enhancement is accomplished through provision of a liner which comprises at least one adhesive release layer and at least one layer of a getter material capable of sorbing at least one permeable substance.

9 Claims, 3 Drawing Sheets

LINER FOR PROTECTION OF ADHESIVES

The present invention relates to the technical field of the liners for the protection of adhesives that are used, for example, for adhesive tapes. A new such liner is proposed which features an enhanced protective function with respect more particularly to permeable substances. The invention further relates to an adhesive at least partially covered with the liner, and also to a method for the protection of an adhesive and to the use of getter materials in liners.

Optoelectronic arrangements are being used with ever-increasing frequency in commercial products or are close to market introduction. Such arrangements comprise organic or inorganic electronic structures, examples being organic, organometallic or polymeric semiconductors or else combinations of these. Depending on the desired application, the products in question are rigid or flexible in form, there being an increasing demand for flexible arrangements. Arrangements of this kind are frequently produced by printing techniques such as relief, gravure, screen or planographic printing or else by what is known as non-impact printing such as, for instance, thermal transfer printing, inkjet printing or digital printing. In many cases, however, vacuum techniques are used as well, such as chemical vapour deposition (CVD), physical vapour deposition (PVD), plasma-enhanced chemical or physical deposition techniques (PECVD), sputtering, (plasma) etching or vapour coating. Patterning generally takes place through masks.

Examples of optoelectronic applications that are already available commercially or are of interest in terms of their market potential include electrophoretic or electrochromic constructions or displays, organic or polymeric light-emitting diodes (OLEDs or PLEDs) in readout and display devices or as illumination, and also electroluminescent lamps, light-emitting electrochemical cells (LEECs), organic solar cells such as dye or polymer solar cells, inorganic solar cells, more particularly thin-film solar cells, based for example on silicon, germanium, copper, indium and selenium, organic field-effect transistors, organic switching elements, organic optical amplifiers, organic laser diodes, organic or inorganic sensors or else organic- or inorganic-based RFID transponders.

A perceived technical challenge for the realization of sufficient lifetime and function of optoelectronic arrangements in the area of organic and inorganic optoelectronics, especially of organic optoelectronics, is the protection of the components they contain against permeates. Permeates are generally considered to be gaseous or liquid substances which penetrate a solid body and may pervade it or migrate through it. Accordingly, numerous organic or inorganic compounds of low molecular mass may be permeates, with water vapour and oxygen being of particular significance in the context presently described.

A multiplicity of optoelectronic arrangements—especially where organic materials are used—are sensitive both to water vapour and to oxygen. During the lifetime of the electronic arrangements, therefore, protection is necessary through encapsulation, since otherwise there is a dropoff in performance over the application period. Otherwise, for example, oxidation of the constituents of light-emitting arrangements such as electroluminescent lamps (EL lamps) or organic light-emitting diodes (OLEDs) may drastically reduce the luminosity, the contrast in the case of electrophoretic displays (EP displays) or the efficiency in the case of solar cells, within a short time.

Within the field of inorganic and more particularly organic optoelectronics, therefore, there is a high demand for flexible adhesive bonding solutions which represent a barrier to permeates such as oxygen and/or water vapour. A number of approaches to such adhesive bonding solutions can already be found in the prior art.

Accordingly, with relative frequency, liquid adhesives and adhesive bonding agents based on epoxides are used as barrier adhesives, as are described in WO 98/21287 A1, U.S. Pat. No. 4,051,195 A and U.S. Pat. No. 4,552,604 A, for example. Their principal field of use is in marginal bonds in rigid arrangements, but also moderately flexible arrangements. Curing takes place thermally or by means of UV radiation.

The use of these liquid adhesives is accompanied, however, by a series of unwanted effects as well. For instance, low molecular mass constituents (VOCs—volatile organic compounds) may damage the sensitive electronic structures of the arrangement and hinder production.

The adhesive, furthermore, has to be applied, in a costly and inconvenient procedure, to each individual constituent of the arrangement. The acquisition of expensive dispensers and fixing devices is necessary in order to ensure precise positioning. The nature of the application has the effect, moreover, of preventing a rapid, continuous operation. In the laminating step that is subsequently necessary, the low viscosity may hinder the attainment of a defined film thickness and bond width.

An alternative is to use pressure-sensitive adhesives or hotmelt adhesives to seal optoelectronic constructions. Among the pressure-sensitive adhesives (PSAs) preference is given to using those which after bonding are crosslinkable by introduction of energy (for example actinic radiation or heat). Adhesives of these kinds are described in US 2006/0100299 A1 and WO 2007/087281 A1 for example. Their advantage lies in particular in the fact that the barrier effect of the adhesives can be enhanced by crosslinking.

Also known in the prior art is the use of hotmelt (HM) adhesives. Used here in many cases are copolymers of ethylene, as for example ethylene-ethyl acetate (EEA), ethylene-acrylic acid copolymer (EAA), ethylene-butyl acrylate (EBA) or ethylene-methyl acrylate (EMA). Crosslinking ethylene-vinyl acetate (EVA) copolymers are in general used more particularly for solar cell modules based on silicon wafers. Crosslinking takes place during the sealing operation under pressure and at temperatures of above around 120° C. For many optoelectronic constructions based on organic semiconductors or produced in thin-film processes, this operation is deleterious, as a result of the high temperatures and the mechanical load imposed by the pressure.

Hotmelt adhesives based on block copolymers or functionalized polymers are described in WO 2008/036707 A2, WO 2003/002684 A1, JP 2005-298703 A and US 2004/0216778 A1 for example. An advantage of these adhesives is that the adhesives themselves do not introduce any substance—or only very little substance—into the construction to be encapsulated that itself harms the construction, whereas this problem is relevant particularly in the case of reactive liquid adhesive systems, more particularly those based on acrylate or on epoxy resin. In view of the high number of reactive groups, these systems have a relatively high polarity, and so, in particular, water is present therein. The amount is generally in the range of less than 100 ppm up to more than 1%. For this reason among others, such liquid adhesives—as already mentioned above—are used primarily as an edge sealant for the electronic arrangements, where they are not in direct contact with the active electronic materials.

Another possibility for countering the problem of entrained permeates is to include additionally an absorbing material—called a getter—within the encapsulation, this getter binding—by absorption or adsorption, for example—water or other permeates that permeate through the adhesive or diffuse out of it. An approach of this kind is described in EP1407818 A1, US 2003/0057574 A1 and in US 2004-0169174 A1, among others.

Another measure is to equip the adhesive and/or the substrate and/or the cover of the electronic construction with such binding properties, as is described in WO 2006/036393 A2, DE10 2009 036 970 A1 and DE 10 2009 036 968 A1, for example.

It is possible, furthermore, to use raw materials with a particularly low permeate content or to free the adhesive from permeating substances during production or prior to application, by means, for example, of thermal drying, vacuum drying, freeze drying or the admixing of getters. Disadvantages of such methods are the long drying time and the possibly high or low drying temperatures, which may harm the adhesive or initiate chemical reactions, such as crosslinking for example. Moreover, the operation of admixing and subsequently removing the getters is costly and inconvenient.

Where such adhesive-related measures are taken to reduce the introduction of harmful permeating substances into the construction that is to be protected, it is necessary to maintain the properties produced with the minimum possible restriction, until the adhesive is used. Thus, for example, an adhesive which has been produced in a particularly anhydrous procedure must be protected from water uptake from the environment. Moreover, any getter substances present in the adhesive must be protected against premature saturation from the take-up of permeates from the environment.

This problem is generally solved by providing the adhesives with packaging which is impervious to permeation or at least which inhibits permeation. Liquid adhesives are generally dispensed into corresponding containers, made of metal, for example. Adhesive tapes are often welded into flexible pouches made from permeation-inhibiting material—for example from polyethylene film or from a film laminate of aluminium and polyester. The packaging materials themselves must be very largely free from permeates that might be released on the contents side.

In order to counter weaknesses in the imperviosity of the packaging or to ensure rapid binding of permeates included, a getter is often included in the packaging as well, in the form for example of a pouch filled with silica gel or zeolite. This getter is generally not in direct contact with the contents. A particular disadvantage with this method is the increased cost and inconvenience of packaging.

A specific problem arises in the packaging of sheetlike adhesives, i.e. adhesive tapes or adhesive sheets: when they are stacked as shapes or wound to form a roll, gas—air, for example—is included, which is not in exchange with the rest of the gas space remaining in the packaging. Unwanted permeates present, for example water vapour, therefore do not reach the getter material located in the packaging, and may therefore migrate into the adhesive. Furthermore, such adhesive tapes generally include a temporary liner material, and also often a carrier material as well. These materials may likewise comprise unwanted permeates, which may easily permeate into the adhesive in view in particular of the large area of contact with said adhesive. Getter pouches or getter pads introduced into the packaging may not reliably scavenge and bind these permeates. Freeing the liner materials and carrier materials entirely from the unwanted permeates, by means of drying, for example, is laborious, costly and inconvenient.

EP 2 078 608 A1 discloses the use of liner materials which comprise a special permeation barrier. This approach, however, is not effective against permeates present in the liner or included between liner and adhesive.

There is therefore an ongoing need for liners which reliably protect a sheetlike adhesive from the influence of permeates.

It is an object of the present invention, therefore, to provide a liner which protects an adhesive not only from permeates originating from the environment but also from permeates included in the course of winding or stacking and other processing steps. Accordingly, in the case of a product, such as an adhesive tape, which comprises a largely permeate-free adhesive layer, this adhesive layer is to be kept largely free from permeates for the period of storage and of transport, with the adhesive layer preferably in fact being freed from remaining permeates as well.

The achievement of this object derives from the fundamental concept of the present invention, namely providing a liner with getter materials contained therein.

The invention therefore first provides a liner for the protection of adhesives, which comprises at least one adhesive release layer and at least one layer of a getter material capable of sorbing at least one permeable substance, the getter material being selected from lithium, beryllium, boron, sodium, magnesium, silicon, potassium, calcium, manganese, iron, nickel, zinc, gallium, germanium, cadmium, indium, caesium, barium, boron oxide, calcium oxide, chromium oxide, manganese oxide, iron oxide, copper oxide, silver oxide, indium oxide, barium oxide, lead oxide, phosphorus oxide, sodium hydroxide, potassium hydroxide, metal salts, metal hydrides, anhydrides of single and multiple carboxylic acids, sodium dithionite, carbohydrazide, ascorbates, gallic acid, zeolites, carbon nanotubes, activated carbon and carbodiimides and also mixtures of two or more of the above substances.

A liner of this kind advantageously prevents the penetration of permeates from the environment into the adhesive to be protected, and is also capable of binding permeates present in the adhesive and permeates included between liner and adhesive. The adhesive itself, or a product comprising the adhesive, need therefore not be separately pretreated—by drying, for example.

Adhesive tapes coated with adhesives on one or both sides are usually wound up at the end of the production procedure into a roll in the form of an Archimedean spiral. In order to prevent the adhesives in double-sided adhesive tapes from coming into contact with one another, or in order to prevent the adhesive sticking to the carrier in the case of single-sided adhesive tapes, the adhesive tapes are lined before winding with a liner material (also called release material) which is wound up together with the adhesive tape. The skilled person knows of such liner materials as simply liners or release liners. In addition to the lining of single-sided or double-sided adhesive tapes, liners are also used for lining pure adhesives (adhesive transfer tape) and adhesive-tape sections (for example label).

A liner, accordingly, is a covering material which has an antiadhesive (adhesive) surface and is applied, for the temporary protection of an adhesive, directly to the adhesive, and can generally be removed by simple peeling immediately prior to application of the adhesive.

These release liners also ensure that the adhesive is not contaminated prior to use. In addition, release liners can be tailored via the nature and composition of the release materials to allow the adhesive tape to be unwound with the desired force (easy or difficult). In the case of adhesive tapes coated with adhesive on both sides, moreover, the release liners ensure that the correct side of the adhesive is exposed first during unwinding.

A liner is not part of an adhesive tape, but merely an aid to its production, storage or further processing. Furthermore, in contrast to an adhesive tape carrier, a liner is not firmly joined to a layer of adhesive; instead, the assembly is only temporary and not permanent.

A liner of the invention contains at least one adhesive release layer. The term "adhesive" expresses in accordance with the invention the idea that the release layer has a lower adhesion to the adhesive that is to be covered than does the adhesive to the intended application substrate in its use, and, where appropriate, to the carrier material belonging to the adhesive.

The material of the adhesive release layer is preferably selected from the group encompassing silicones, fluorinated silicones, silicone copolymers, waxes, carbamates, fluoropolymers and polyolefins or mixtures of two or more of the stated substances. With particular preference the material of the adhesive release layer is selected from silicones and polyolefins.

The system forming the adhesive release layer is preferably formulated in such a way that there is essentially no diffusion of adhesive substances into the adhesive. Analytically it may still be possible to detect substances from the adhesive coating, but these can be attributed to mechanical abrasion.

The adhesive release layer preferably has essentially no vapour pressure at room temperature.

The adhesive release layer preferably consists of a silicone system. Such silicone systems are preferably produced using crosslinkable silicone systems. These include mixtures of crosslinking catalysts and so-called thermally curable, condensation-crosslinking or addition-crosslinking polysiloxanes. As crosslinking catalysts for condensation-crosslinking silicone systems, there are frequently tin compounds present in the composition, such as dibutyltin diacetate.

Silicone-based release agents on an addition-crosslinking basis can be cured by hydrosilylation. These release agents typically comprise the following constituents:
- an alkenylated polydiorganosiloxane (more particularly, linear polymers having terminal alkenyl groups),
- a polyorganohydrogensiloxane crosslinking agent and
- a hydrosilylation catalyst.

Established catalysts for addition-crosslinking silicone systems (hydrosilylation catalysts) include, for example, platinum or compounds of platinum, such as the Karstedt catalyst (a Pt(0) complex compound) for example.

Thermally curing release coatings are therefore frequently multi-component systems, consisting typically of the following components:
a) a linear or branched dimethylpolysiloxane which consists of around 80 to 200 dimethylpolysiloxane units and is stopped with vinyldimethylsiloxy units at the chain ends. Typical representatives are, for example, solvent-free, addition-crosslinking silicone oils having terminal vinyl groups, such as Dehesive® 921 or 610, both available commercially from Wacker-Chemie GmbH;
b) a linear or branched crosslinker, typically composed of methylhydrogensiloxy units and dimethylsiloxy units, with the chain ends being satisfied either with trimethylsiloxy groups or dimethylhydrogensiloxy groups. Typical representatives of this class of product are, for example, hydrogenpolysiloxanes having a high reactive Si—H content, such as the crosslinker V24, V90 or V06, which are available commercially from Wacker-Chemie GmbH;
c) a silicone MQ resin, possessing as M unit not only the trimethylsiloxy units typically used but also vinyldimethylsiloxy units. Typical representatives of this group are, for example, the release force regulators CRA® 17 or CRA® 42, available commercially from Wacker-Chemie GmbH;
d) a silicone-soluble platinum catalyst such as, for example, a platinum-divinyltetramethyldisiloxane complex, which is commonly dubbed Karstedt complex and is available commercially for example under the name Katalysator OL from Wacker-Chemie GmbH.

It is also possible to use photoactive catalysts, known as photoinitiators, in combination with UV-curable, cationically crosslinking siloxanes based on epoxide and/or vinyl ether, and/or UV-curable, free-radically crosslinking siloxanes such as, for instance, acrylate-modified siloxanes. The use of electron beam-curable silicone acrylates is likewise possible. Such systems, depending on their intended use, may also include further additions such as stabilizers or flow control assistants.

Silicone-containing systems may be acquired commercially from Dow Corning, Wacker or Rohm & Haas, for example.

One example is Dehesive® 914, which comprises a vinylpolydimethylsiloxane, Crosslinker V24, a methylhydrogenpolysiloxane and Catalyst OI, a platinum catalyst in polydimethylsiloxane. This system is available from Wacker-Chemie GmbH.

Also possible for use, for example, is the commercially available addition-crosslinking silicone release system Dehesive® 940A from Wacker-Chemie with an associated catalyst system, which is applied in the non-crosslinked state and then subsequently crosslinked in the applied state.

Among the stated silicones, the addition-crosslinking silicones have the greatest economic importance. An undesirable feature of these systems, however, is their sensitivity to catalyst poisons, such as heavy metal compounds, sulphur compounds and nitrogen compounds, for example. Generally it is the case that electron donors may be considered to be platinum poisons (A. Colas, Silicone Chemistry Overview, Technical Paper, Dow Corning). Accordingly, phosphorus compounds such as phosphines and phosphites are among those compounds considered to be platinum poisons. The presence of catalyst poisons means that the crosslinking reaction between the different constituents of a silicone release coating material takes place no longer at all or only to a small extent. In the production of antiadhesive silicone coatings, therefore, the presence of catalyst poisons, more particularly of platinum poisons, is strictly avoided. The getter material present in the liner of the invention is therefore preferably not a platinum poison.

Particular embodiments of the silicone systems are polysiloxane block copolymers, with a urea block, for example, like those available from Wacker under the tradename "Geniomer", or release systems comprising fluorosilicones, which are used in particular with adhesive tapes featuring silicone adhesives.

Polyolefinic release layers may consist of thermoplastic, non-elastic or elastic materials. For example, such release layers may be based on polyethylene. For this purpose it is possible to utilize polyethylenes in the entire realisable density range from approximately 0.86 g/cm$^3$ to 1 g/cm$^3$.

For certain applications, polyethylenes of lower density are appropriate with preference, since they frequently produce lower release forces.

Release layers having elastic properties may also consist of olefin-containing elastomers. Examples include both random copolymers and block copolymers. Examples among the block copolymers include ethylene-propylene rubbers, butyl rubber, polyisobutylene, ethylene block copolymers and also partly and fully hydrogenated styrene-diene block copolymers such as, for example, styrene-ethylene/butylene and styrene-ethylene/propylene block copolymers.

Suitable release layers can also be provided, furthermore, by acrylate copolymers. Preferred embodiments of this variant are acrylate polymers having a static glass transition temperature (mid-point Tg as determined via differential calorimetry) which is below room temperature. The polymers are typically crosslinked. Crosslinking may be chemical or physical, of the kind realized in block copolymers, for example.

The at least one adhesive release layer of the liner of the invention preferably has a layer thickness of 0.5 μm to 300 μm. This range embraces not only thin coatings of the release layer material (for example silicone) but also carrierless liners, which are produced completely from the release layer material (for example a sheet of a suitable polyolefin).

The adhesive release layer may be applied directly by means of a coating bar from solution, emulsion or dispersion. The solvent, emulsifying medium or dispersing medium used, respectively, may in this case be evaporated subsequently in a commercial dryer. Solvent-free coating by means of a nozzle or roll coating unit is also suitable.

In accordance with the invention the adhesive layer may also be printed. Suitable for this purpose in accordance with the prior art are gravure and screen printing processes. It is preferred here to employ rotary printing processes. Furthermore, adhesive coatings may also be applied by spraying. This may take place in a rotary spraying process, optionally also electrostatically.

The material of the adhesive release layer and the material of any carrier layer optionally present need not take the form of homogeneous materials, but instead may also consist of mixtures of two or more materials. Accordingly, for the purpose of optimizing the properties and/or processing, the materials may in each case have been blended with one or more additives such as resins, waxes, plasticizers, fillers, pigments, UV absorbers, light stabilizers, ageing inhibitors, crosslinking agents, crosslinking promoters, defoamers, degassing agents, wetting agents, dispersing assistants, rheological additives or elastomers.

In the simplest case, the liner of the invention consists only of the adhesive release layer and of a layer of a getter material capable of sorbing at least one permeable substance (this material also being identified below as "getter material layer" or as "getter layer"). In a further embodiment, the liner of the invention includes at least one carrier layer. In this case the adhesive release layer may be applied directly to the carrier layer or to the getter material layer and may at least partially cover said layer. The getter material layer may therefore be disposed between carrier material and release layer and/or on the side which is opposite the release-layer-coated side of the carrier material. Typically, an adhesive release layer is applied in the form of a continuous (uninterrupted) outermost layer at least on the adhesive-facing side of the carrier material.

Independently of the presence of a carrier layer, the liner of the invention may also have an adhesive surface on both sides, at least partially, and this surface may be the same or different.

As carrier material of the liner it is possible to use papers, plastic-coated papers or sheets, with preference being given to sheets, more particularly to dimensionally stable polymeric films or metallic foils. The at least one carrier layer therefore consists preferably of polyesters, more particularly of polyethylene terephthalate, for example of biaxially oriented polyethylene terephthalate, or of polyolefins, more particularly of polybutene, cycloolefin copolymer, polymethylpentene, polypropylene or polyethylene, for example of monoaxially oriented polypropylene, biaxially oriented polypropylene or biaxially oriented polyethylene. Polyester films have the advantage of possessing good barrier properties, ensuring temperature stability, and contributing enhanced mechanical stability. With very particular preference, therefore, the at least one carrier layer of the liner of the invention consists of a polyester film, for example of biaxially oriented polyethylene terephthalate.

Papers or nonwoven webs are other suitable carrier materials.

In one preferred embodiment the liner of the invention comprises a barrier layer against one or more specific permeates, more particularly against water vapour and oxygen. It is likewise preferred in accordance with the invention for the liner to comprise at least one carrier layer and for this carrier layer to have a barrier function against one or more specific permeates. A barrier function of this kind may consist of organic or inorganic materials. Carrier materials with a barrier function are set out comprehensively in EP 2 078 608 A1.

With particular preference the liner of the invention comprises at least one inorganic barrier layer. Suitable inorganic barrier layers include metal nitrides or metal hydronitrides that are deposited particularly well under reduced pressure (for example by means of evaporation, CVD, PVD, PECVD or ALD (Atomic Layer Deposition)) or under atmospheric pressure (for example by means of atmospheric plasma, reactive corona discharge or flame pyrolysis), examples being nitrides of silicon, of boron, of aluminium, of zirconium, of hafnium or of tellurium; and also oxides of silicon, of boron, of aluminium, of zirconium, of hafnium and of tellurium; and also indium tin oxide (ITO). Likewise suitable are layers of the aforementioned variants that are doped with further elements.

With particular preference the liner of the invention comprises at least one carrier layer and at least one barrier layer against one or more specific permeates, the barrier layer and the carrier layer taking the form of layers which follow one another directly. A particularly suitable method for applying an inorganic barrier layer is high-power impulse magnetron sputtering or atomic layer deposition by means of which it is possible to realize layers which are particularly impervious to permeation, while imposing a low temperature load on the carrier layer. Preference is given to a permeation barrier, of the carrier layer with barrier function or of the assembly of carrier layer and barrier layer, against water vapour (WVTR) of <1 $g/(m^2*d)$ and/or against oxygen (OTR) of <1 $cm^3/(m^2*d*bar)$, the value being based on the respective carrier layer thickness used in the liner, in other words not standardized to a specific thickness. The WVTR is measured at 38° C. and 90% relative atmospheric humidity in accordance with ASTM F-1249, and the OTR is measured at 23° C. and 50% relative atmospheric humidity in accordance with DIN 53380-Part 3.

The liner of the invention further comprises at least one layer of a getter material capable of sorbing at least one permeable substance.

"Sorbing" refers to "sorption", this being the process of selective take-up of one substance or of a plurality of substances by another substance—in accordance with the invention, by the getter material. The sorbing of the permeable substance(s) by the getter material may take place, for example, by absorption or adsorption and adsorption may occur both in the form of chemisorption and of physisorption.

A "permeable substance" is a substance which as a gaseous or liquid substance, or possibly even as a solid substance, is able to penetrate into the adhesive to be protected, and subsequently to saturate it. Substances of this kind are referred to below—as has already been the case a number of times in the present text—as "permeates". The permeates may originate from the adhesive itself or from the environment, as for example from the carrier material of an adhesive tape coated with the adhesive. From the adehsive or from the adhesive tape itself come, frequently, low molecular mass organic compounds such as solvent residues, residual monomers, oils, resin components, plasticizers and water. The environment is often a source of water, volatile organic compounds (VOCs), low molecular mass hydrocarbons and oxygen. Substances considered to be "permeable substances" include more particularly the following:

acetonitrile, 1-butanol, chlorobenzene, chloroform (trichloromethane), cyclohexane, diethyl ether, 1,4-dioxane, glacial acetic acid (acetic acid), acetic anhydride, acetic acid ethyl ester (ethyl acetate, ethyl ethanoate), acetic acid n-butyl ester (n-butyl acetate), acetic acid tert-butyl ester (tert-butyl acetate), ethanol, methanol, n-hexane, n-heptane, 3-hexanone, 2-propanol (isopropanol), 3-methyl-1-butanol (isoamyl alcohol), methylene chloride (dichloromethane), methyl ethyl ketone (butanone), methyl isobutyl ketone, nitromethane (nitrocarbol), n-pentane, 2-pentanone, 3-pentanone, petroleum ether (light benzine), benzine, propanol, pyridine (azine), tert-butyl methyl ether, tetrachloroethene (perchloroethene), tetrahydrofuran, toluene, trichloroethane, triethylamine, xylene, oxygen, methane, ethane, propane, propene, butane, butene, carbon dioxide, ozone, sulphur dioxide, water.

A "getter material" is a material which—in the sense of the process defined above as "sorption"—is able selectively to take up at least one permeable substance. The getter material could therefore also be referred to as a "sorbent" or "sorption agent". The getter material is preferably capable at least of the sorption of water.

The getter material takes the form preferably of a coherent, continuous and uninterrupted layer. Alternatively it may also be an interrupted layer or else have holes. In accordance with the invention it is possible to apply a full-area or interrupted layer of getter material in powder form to a carrier material and to bind it to the subsequently applied release layer on the carrier material by means for example of a thermal and/or mechanical operation such as hot rolling, for example. An interrupted layer has the advantage that permitted permeates are able to pass through the layer more easily, but permeates which are to be bound are captured. Moreover, an interrupted layer consisting of particles, for example, has a higher surface area than a full-area, smooth layer, and so the sorption capacity of the getter material is manifested more effectively.

The thickness of the getter material layer is dependent in particular on the desired take-up capacity for the particular permeate. A lower limit can be regarded as being constituted by the minimum thickness of a continuous layer of a getter material with high take-up capacity, for example a calcium layer, and may be estimated at about 20 nm. Considered as an upper limit is the thickness of a foil consisting of metallic getter material, as for example of a barium-zinc alloy, which in terms of its stiffness still allows an adhesive tape to be wound up. A layer thickness of this kind may be put at around 100 µm.

The getter material layer is preferably made of the pure getter material. It is, for example, a getter material layer applied by vapour deposition or sputtering. In a further embodiment there is at least one additional material present in dispersion in the getter layer. This further material is, for example, a gas, and so the getter layer with particular advantage takes the form of a foam, more particularly an open-celled foam. This has the advantage of a particularly high active surface area for the getter layer. Methods for producing metal foams are known from DE 10 2009 020 004 A1 for example. Materials in solid or liquid state as well may be present in dispersion in the getter material layer. These may be, for example, materials which bind a getter material which undergoes liquefaction on take-up of permeate, such as lithium chloride for example, or which bind evolving gases, as for example hydrogen in the case of the reaction of barium with water. Pore formers as well, which are removed again after the getter material layer has formed, may constitute the material in dispersion in the getter layer. These may be, for example, organic materials which are initially incorporated during electrochemical deposition of a getter material layer, but in a subsequent step are leached out again, and so leave behind a porous getter material structure.

A getter material present in dispersed form (as dispersed phase) in a layer of the liner is not a "layer of a getter material capable of sorbing at least one permeable substance" in the sense of the invention. A "layer of a getter material capable of sorbing at least one permeable substance" in accordance with the invention is present only when the layer is formed substantially by the getter material itself, for example as exclusive material of the layer or as continuous phase of a dispersion. A continuous phase of a dispersion is also considered in the sense of the invention to be represented by percolated particles. By "percolated particles" are meant particles which are in interaction with one another in such a way as to form coherent regions or clusters. Since the presence of a percolation is not immediately detectable, a weight fraction of the getter material of 50% within a dispersion is defined alternatively as a percolation threshold.

In accordance with the invention the getter material is selected from lithium, beryllium, boron, sodium, magnesium, silicon, potassium, calcium, manganese, iron, nickel, zinc, gallium, germanium, cadmium, indium, caesium, barium, boron oxide, calcium oxide, chromium oxide, manganese oxide, iron oxide, copper oxide, silver oxide, indium oxide, barium oxide, lead oxide, phosphorus oxide, sodium hydroxide, potassium hydroxide, metal salts, metal hydrides, anhydrides of single and multiple carboxylic acids, carbohydrazide, ascorbates, gallic acid, zeolites, carbon nanotubes, activated carbon and carbodiimides and also mixtures of two or more of the above substances.

The metal salts are preferably selected from cobalt chloride, calcium chloride, calcium bromide, lithium chloride, lithium bromide, zinc chloride, zinc bromide, calcium sulphate, copper sulphate, sodium dithionite, sodium carbonate, sodium sulphate, potassium carbonate, magnesium carbonate, magnesium chloride, potassium sulphite, magnesium perchlorate, barium perchlorate, aluminium sulphate, barium sulphate, magnesium sulphate, lithium sulphate and cobalt sulphate.

The metal hydrides are preferably selected from calcium hydride, sodium hydride and lithium aluminium hydride.

Anhydrides of single and multiple carboxylic acids are preferably selected from acetic anhydride, propionic anhydride, butyric anhydride and methyltetrahydrophthalic anhydride.

In accordance with their function the getter materials are used preferably as materials free from permeates, for example in anhydrous form. It is also possible in accordance with the invention, however, to use materials that are already partly complexed with permeates, such as $CaSO_4 * \frac{1}{2}H_2O$ (calcium sulphate hemihydrate), for example.

"Carbodiimides" are compounds of the general formula $R^1-N=C=N-R^2$, where $R^1$ and $R^2$ are organic radicals, more particularly alkyl radicals or aryl radicals, which may be identical or different.

Preferably the getter material is selected from magnesium, calcium, manganese, iron, nickel, zinc, barium, barium oxide, boron trioxide, calcium chloride, calcium oxide, calcium sulphate, copper sulphate, lithium chloride, lithium bromide, magnesium chloride, magnesium perchlorate, magnesium sulphate, phosphorus oxide, potassium carbonate, potassium hydroxide, sodium, sodium hydroxide, sodium sulphate, zinc chloride, carbodiimides and zeolites and also mixtures of two or more of the above substances. These materials have a high sorption capacity for at least one of the abovementioned permeates and more particularly for water.

With particular preference the getter material is selected from magnesium, calcium, iron, barium, calcium oxide, chromium oxide, manganese oxide, iron oxide, copper oxide, silver oxide and barium oxide and also mixtures of two or more of the above substances. These getter materials offer the advantage that they can be deposited easily in layer form, for example by vacuum coating methods, to the relevant layer of the liner, and exhibit a high sorption capacity.

In a further preferred embodiment of the liner of the invention, the getter material is selected from calcium oxide, calcium sulphate, calcium chloride, sodium sulphate, potassium carbonate, copper sulphate, magnesium perchlorate, magnesium sulphate and zeolites and also mixtures of two or more of the above substances. The feature of these materials is that they are regenerable getter materials. By these are meant substances which are able to release absorbed permeates, for example water, again under defined conditions and thereby to enter a state which enables them to take up permeate again. This makes possible a method in which the getter-containing liner, before being contacted with the adhesive, is largely freed—by drying, for example—from any permeates taken up prior to that point in time. As a result of this, advantageously, the full getter capacity is available when the liner is used.

With very particular preference the getter material is selected from magnesium, calcium, iron, barium, calcium oxide, calcium sulphate, calcium chloride and zeolites and also mixtures of two or more of the above substances. These materials have particularly high capacities for the uptake of water and further permeates, are very largely regenerable, and can be integrated outstandingly in layer form into the liner, for example by coating onto a carrier layer or onto the adhesive release layer.

In the context of a particular embodiment of the liner of the invention, the getter material is selected from calcium, iron, barium, lithium chloride, cobalt chloride and calcium oxide and also mixtures of two or more of the above substances. These substances, via a change in their optical properties, allow conclusions to be drawn about the permeate content of the adhesive, by reacting to increasing water uptake, for example, by a change from white (calcium oxide) or a metallically opaque appearance (calcium, barium) to a transparent appearance or, in the case of iron, to a brownish discoloration. Therefore, for as long as free getter capacity is still evident from the optical appearance of the liner, this may be taken as an indication that up to that point no permeate, or little permeate at most, has diffused into the adhesive that is to be protected.

In a further preferred embodiment, the getter material binds the permeate by chemisorption. Owing to the generally relatively high activation energy, this process is slower than physisorption. One known example here is calcium oxide, which is converted by the water permeate into calcium hydroxide. As a result of slower reaction, the possibility is provided of handling the getter material for a short time in ambient atmosphere without already losing a substantial part of the uptake capacity.

Preferred, moreover, is a getter material which possesses a high activity even at low permeate concentration. For water as the permeate, accordingly, it is preferred to use those getter materials over whose saturated aqueous solution a relative atmospheric humidity of less than 20% is developed at 20° C. and an atmospheric pressure of 1013 mbar. From the standpoint of activity at low permeate concentration, the getter material is preferably selected from the group encompassing sodium hydroxide, potassium hydroxide, lithium bromide, zinc bromide, lithium chloride, calcium bromide, lithium iodide and calcium acetate.

In a further preferred embodiment, the material of the adhesive release layer has a permeate permeability more particularly for water vapour of at least $100 \text{ g}/(m^2*d)$, more preferably of at least $500 \text{ g}/(m^2*d)$, in each case based on a layer thickness of 50 μm. The permeability or permeation barrier against water vapour (WVTR) is measured at 38° C. and 90% relative atmospheric humidity according to the ASTM F-1249; the permeation barrier against oxygen is measured at 23° C. and 50% relative atmospheric humidity in accordance with DIN 53380-Part 3. The stated permeate permeability of the release layer material is advantageous in that the permeate reaches the getter material layer particularly quickly and effectively, especially from the adhesive. It is therefore particularly preferred to use a silicone-based or acrylate-based release layer.

The total amount of getter material in the liner of the invention may be from 0.5% to 95% by weight, based on the total weight of all the layers of the liner. The amount depends substantially on the desired uptake capacity for the permeate or permeates in question.

If, for example, only a low uptake capacity is required, it may be sufficient to use a getter material having a low uptake capacity in a low layer thickness. In one preferred embodiment, therefore, the liner comprises 0.5% to 5% by weight of getter material, based on the total weight of the liner. In this case the thickness and the area of the matrix containing drying agent may be situated advantageously at the respective lower limits.

In the case of a very high required uptake capacity on the part of the liner, however, it is necessary to use a getter material layer having a high thickness, and the getter material as well ought to possess a high uptake capacity. However, a getter material with a low uptake capacity can also be used if advisable from the standpoint of cost or compatibility. In the context of a further preferred embodiment of the liner of the invention, therefore, the liner comprises 60% to 95% by weight of getter material, based on the total weight of all the layers of the liner.

A getter material with a high uptake capacity (maximum acquirable permeate weight >25% of the getter weight) is preferred, since by this means the amount of getter can be minimized. The uptake capacity is determined in this case after storage of the getter material for 100 hours at 23° C. and 50% relative atmospheric humidity for water vapour as the permeate, or at 23° C. in a saturated atmosphere in the case of other gaseous permeates. The permeate content of the getter after storage can be determined by gravimetry. From the standpoint of uptake capacity, the getter material is preferably selected from the group encompassing copper sulphate, calcium oxide and calcium chloride.

In one preferred embodiment the liner of the invention consists of a carrier layer, an adhesive release layer and a layer of a getter material capable of sorbing at least one permeable substance. In this case, therefore, the liner contains exclusively these three layers. This is advantageous because such a liner is more flexible than a multilayer liner and the anchoring between the layers is easier to achieve than with a multilayer liner. Furthermore, a liner of this kind can be produced using less material. Relative to a liner containing only one release layer, the embodiment with an additional carrier layer has the advantage that the release function and the mechanical stabilization function are present in decoupled form, in two layers, and hence that particularly suitable materials can be selected for each function.

In further preferred embodiments, the liner of the invention comprises a carrier layer, an adhesive release layer, a layer of a getter material capable of sorbing at least one permeable substance, and further layers. These further layers may be, for example, primer layers, enhancing the interlaminar adhesion between other layers; optically active layers such as printed layers or radiation filters, for example; or further release layers.

The liner of the invention is preferably transparent—that is, the transmittance measured in accordance with ASTM D1003-00 (procedure A) is greater than 50%, preferably greater than 75%. With a transparent liner the adhesive tape can be positioned more easily in the application.

With particular preference the liner of the invention is opaque to UV light—that is, the transmittance in a wavelength range from 200 to 400 nm, measured in accordance with ASTM D1003-00 (procedure B), is less than 25%, preferably less than 10%. With a UV-opaque liner, the adhesive can be protected from alterations (for example chemical reactions, ageing, crosslinking) as a result of the influence of UV light.

The present invention further provides an adhesive which is covered on at least one side and at least partially with a liner of the invention. The adhesive is preferably a pressure-sensitive adhesive or an activatable adhesive and more particularly an activatable pressure-sensitive adhesive.

Pressure-sensitive adhesives (PSAs) are adhesives whose set film in the dry state at room temperature remains permanently tacky and adhesive. Even with relatively weak applied pressure, PSAs permit a durable bond to be made to the substrate, and after use can be detached from the substrate again with substantially no residue. The bondability of the adhesives is based on their adhesive properties, and their redetachability on their cohesive properties.

In accordance with the invention it is possible to use all PSAs known to the skilled person, thus including, for example, those based on acrylates and/or methacrylates, polyurethanes, natural rubbers, synthetic rubbers; styrene block copolymer compositions with an elastomer block composed of unsaturated or hydrogenated polydiene blocks such as, for example, polybutadiene, polyisoprene, and copolymers of both and also further elastomer blocks familiar to the skilled person; polyolefins, fluoropolymers and/or silicones.

Where acrylate-based PSAs are referred to in the context of this specification, the term encompasses, without explicit reference, PSAs based on methacrylates and those based on acrylates and methacrylates, unless expressly described otherwise. Likewise suitable for use in the sense of the invention are combinations and mixtures of two or more base polymers and also adhesives additized with tackifier resins, fillers, ageing inhibitors and crosslinkers, the recitation of the additives being only by way of example and being non-limiting in its interpretation.

Preference is given to PSAs based on styrene block copolymers, polybutylenes, polyolefins or fluoropolymers, since these adhesives are notable for a high permeation barrier against water vapour and also for a low water content.

Activatable adhesives are considered to be those adhesive systems where bonding is accomplished as a result of an input of energy, by actinic radiation or heat, for example.

Heat-activatedly bonding adhesives can be classed in principle in two categories: thermoplastic heat-activatedly bonding adhesives (hotmelt adhesives) and reactive heat-activatedly bonding adhesives (reactive adhesives). Likewise encompassed are those adhesives which can be assigned to both categories, namely reactive thermoplastic heat-activatedly bonding adhesives (reactive hotmelt adhesives).

Thermoplastic adhesives are based on polymers which on heating undergo reversible softening and solidify again during cooling. Thermoplastic adhesives which have emerged as being advantageous are especially those based on polyolefins and copolymers of polyolefins and also on their acid-modified derivatives, on ionomers, on thermoplastic polyurethanes, on polyamides and also polyesters and copolymers thereof, and also on block copolymers such as styrene block copolymers.

In contrast, reactive heat-activatedly bonding adhesives comprise reactive components. The latter constituents are also identified as "reactive resins", in which heating initiates a crosslinking procedure which after the end of the crosslinking reaction ensures a durable, stable bond. Such adhesives preferably also comprise elastic components, for example synthetic nitrile rubbers or styrene block copolymers. Such elastic components give the heat-activatedly bonding adhesive particularly high dimensional stability even under pressure, on account of their high flow viscosity.

Radiation-activated adhesives are likewise based on reactive components. The latter constituents may comprise, for example, polymers or reactive resins in which the irradiation initiates a crosslinking process which after the end of the crosslinking reaction ensures a durable, stable bond. Such adhesives preferably also comprise elastic components, such as those recited above.

It is preferred to use activatable adhesives based on epoxides, oxetanes (meth)acrylates or modified styrene block copolymers.

The adhesive before being contacted with the liner of the invention preferably has a permeate content of less than 1000 ppm, more preferably of less than 100 ppm. The ppm figure here refers to the relation between the total weight of permeate present and the analyzed weight of adhesive. The permeate content may be determined by means of headspace gas chromatography in accordance with VDA 277 or in the case of water by DIN EN ISO 62 (gravimetric technique, method 4) or DIN 53715 (Karl-Fischer titration) after storage of the test specimen for 24 hours at 23° C. and 50% relative atmospheric humidity. In the case of the permeate contents of the adhesive that are described here, the capacity of the getter materials in the liner is not so greatly taxed by permeates diffusing out of the adhesive, but the liner is able better to fulfil its function as a cover which protects against permeates from the environment.

The adhesive preferably has a low permeation rate for the permeate to be immobilized. In the case of water vapour as the permeate, the water vapour permeation rate (WVTR) is preferably less than 50 g/m² day, more preferably less than 20 g/m² day, based on an adhesive thickness of 50 μm. The WVTR here is measured at 38° C. and 90% relative atmospheric humidity in accordance with ASTM F-1249, the oxygen permeation rate (OTR) is measured at 23° C. and 50% relative atmospheric humidity in accordance with DIN 53380-Part 3.

As a result of the low permeation rate on the part of the adhesive, less permeate diffuses from the environment through the adhesive and into the getter material-containing liner, which is able therefore to fulfil its function for longer or can be furnished with a smaller amount of getter material, thus reducing the materials usage and saving on costs.

The adhesive of the invention preferably takes the form of an adhesive tape. The adhesive tape thus comprises at least one layer of a PSA or of an activatable adhesive or more particularly of an activatable PSA. The adhesive tape may also comprise further layers, for example one or more further layers of adhesive, or a carrier material.

The adhesive tape preferably comprises only one layer of an adhesive (adhesive transfer tape), since this keeps the construction simple and allows the number of possible permeates that need be taken into account to be kept small, as a result of the relatively low diversity of materials. Furthermore, there is no carrier material to hinder the diffusion of permeates from the adhesive tape to the getter-containing liner, allowing the adhesive tape to be freed from permeates in a particularly efficient way.

The thickness of the adhesive tape may span all customary thicknesses, in other words, approximately, from 3 μm up to 3000 μm. A thickness of between 25 and 100 μm is preferred, since within this range, bond strength and handling properties are particularly positive. A further preferred range is a thickness of 3 to 25 μm, since in this range the amount of substances permeating through the bondline can be minimized solely by the small cross-sectional area of the bondline in an encapsulation application. It has surprisingly emerged, moreover, that such low adhesive tape thicknesses can be freed effectively from permeates through the getter-filled liner.

Particularly preferred are adhesive transfer tapes, since in that case there is no carrier material to hinder the diffusion of permeates from the adhesive tape to the getter-containing liner and hence the adhesive tape can be freed from permeates in a particularly efficient way.

The present invention further provides a method for the protection of an adhesive from permeates, this method comprising the at least single-sided and at least partial covering of the adhesive with a liner of the invention.

To produce an assembly composed for example of an adhesive tape and a liner of the invention, the carrier of the adhesive tape, or the liner, is coated or printed on one side with the preferred PSA of the adhesive tape, from solution or dispersion or in 100% form (as a melt, for example), or the assembly is produced by coextrusion. An alternative option is to form the assembly by transfer of a layer of adhesive or of a liner by lamination. The layer or layers of adhesive may be crosslinked by heat or high-energy radiation.

This operation preferably takes place in an environment in which the specific permeate is present only in a low concentration or almost not all. An example that may be given is a relative atmospheric humidity of less than 30%, preferably of less than 15%.

To optimize the properties it is possible for the self-adhesive composition employed to be blended with one or more additives such as tackifiers (resins), plasticizers, fillers, pigments, UV absorbers, light stabilizers, ageing inhibitors, crosslinking agents, crosslinking promoters or elastomers.

The amount of the layer of adhesive is preferably 1 to 5000 g/m², preferably 10 to 100 g/m², where "amount" means the amount after any removal of water or solvent that may be carried out.

The present invention additionally provides for the use of getter material capable of sorbing at least one permeable substance for the furnishing of liners for the protection of adhesives.

Additionally provided for the present invention is the use of a liner of the invention for the at least single-sided and at least partial covering of adhesive tape in methods for the encapsulation of optoelectronic components and/or of an aerobically curing adhesive and/or of a moisture-curing adhesive.

The present invention further provides for the use of the liner of the invention, preferably comprising calcium oxide, metallic calcium and/or cobalt chloride as getter material, for indicating the permeate content of an adhesive covered with the liner. This indication is achieved through a change in the optical properties of the getter material present in the liner. Thus, for example, calcium oxide changes colour from white to transparent as the binding of water progresses. Metallic calcium as well loses its metallically opaque appearance and becomes increasingly transparent. Therefore, as long as getter material can still be recognized in the visual appearance of the unused state, this may be taken to be an indication that there is as yet no diffusion, or at most low diffusion, of permeate to the adhesive that is to be protected.

DRAWINGS

10: Carrier layer
11: Release layer
20-25: Layer of getter material

FIG. 1 shows a liner of the invention consisting of a release layer (11) and a carrier layer (10) and also a continuous layer of getter material (20) in between.

FIG. 2 shows a liner of the invention consisting of a release layer (11) and a carrier layer (10) and also a perforated layer of getter material (21) in between.

FIG. 4 shows a liner of the invention consisting of a release layer (11) and a carrier layer (10) and also a layer of particulate getter material (23) in between.

EXAMPLES

Figure 1:
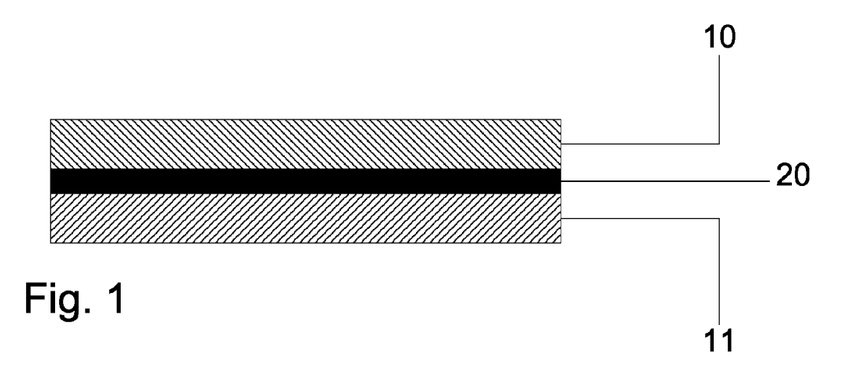
Figure 2:
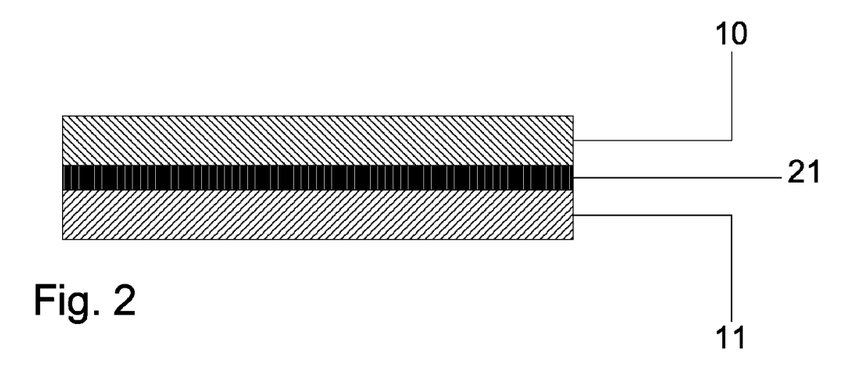
Figure 3:
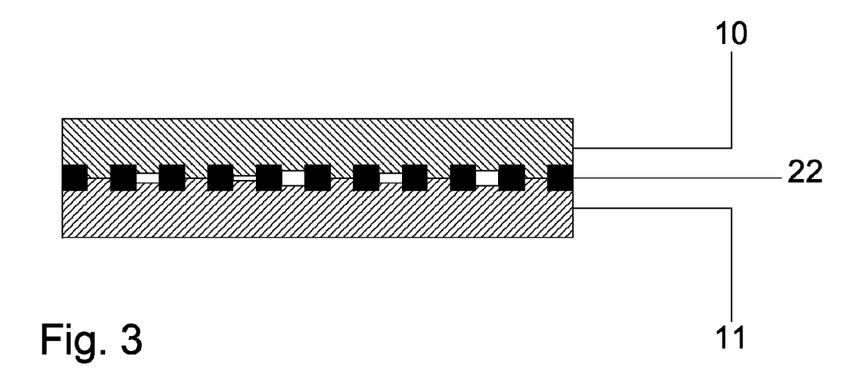
FIG. 3 shows a liner of the invention consisting of a release layer (11) and a carrier layer (10) and also a perforated layer of getter material (22) in between, where the layer of getter material penetrates at least partly into the surface of the release layer and of the carrier layer.
Figure 4:
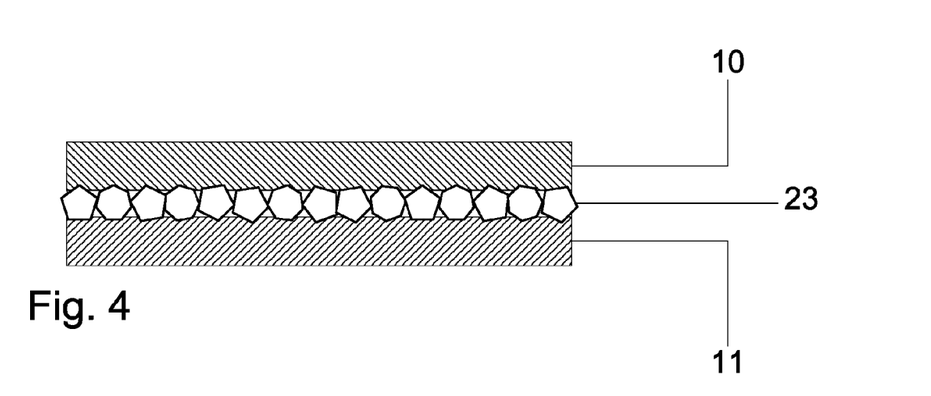
Figure 5:
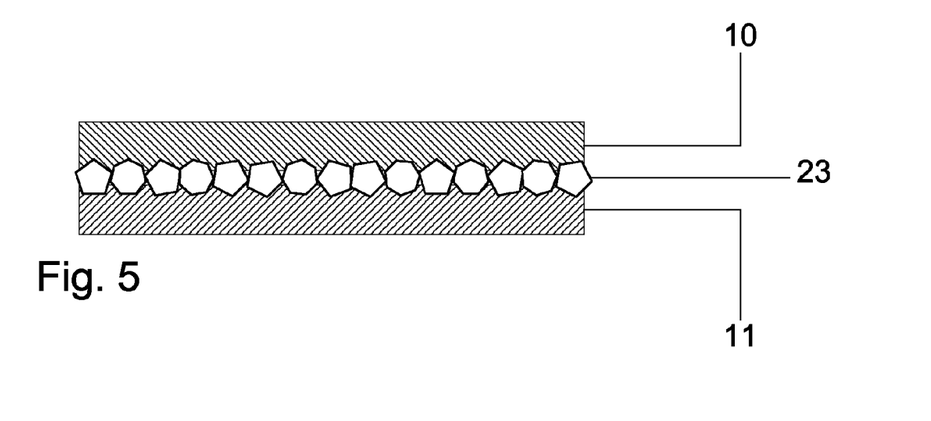
FIG. 5 shows a liner of the invention consisting of a release layer (11) and a carrier layer (10) and also a layer of particulate getter material (23) in between, where the layer of getter material penetrates at least partly into the surface of the release layer and of the carrier layer.
Figure 6:
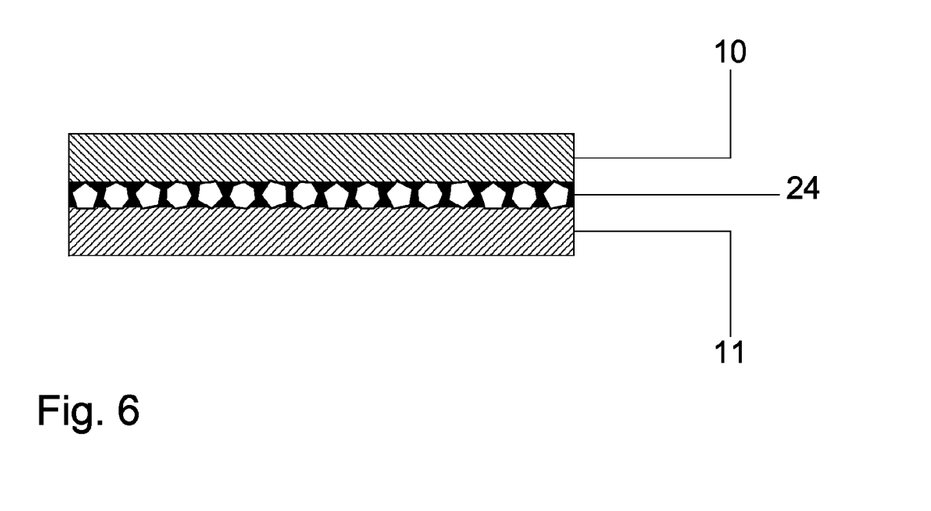
FIG. 6 shows a liner of the invention consisting of a release layer (11) and a carrier layer (10) and also a layer of particulate getter material (24) in between, in which the getter material is embedded in a matrix material and comprises more than 50% by weight of the getter material layer.
Figure 7:
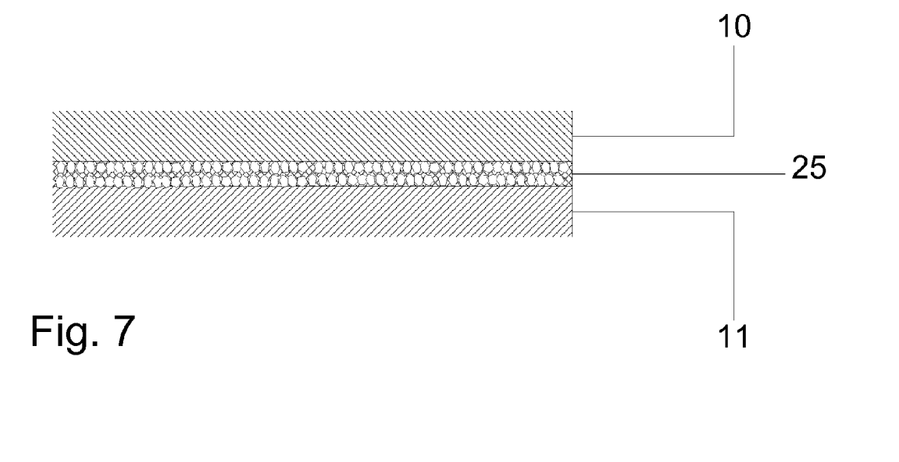
FIG. 7 shows a liner of the invention consisting of a release layer (11) and a carrier layer (10) and also a layer of particulate getter material (25) in between, in which the getter material is embedded loosely in a sheetlike textile structure material and comprises more than 50% by weight of the getter material layer.

Various liners provided with a getter material layer were produced. They were laminated to various adhesive tapes by means of a laboratory roll laminator in a controlled-climate chamber at 23° C. and a relative atmospheric humidity of 50%.

Adhesive Tapes

To produce adhesive tapes, different pressure-sensitive adhesives (PSAs) were applied, using a laboratory coating instrument, from a solution to a conventional liner which is not in accordance with the invention and is not impervious to permeation, this liner being of the type ALU I 38 UV1 from Mondi, comprising an aluminium foil carrier, and dried. The layer thickness of the adhesive after drying was 25 µm in each case. Drying took place in each case at 120° C. for 30 minutes in a laboratory drying cabinet.

K1: Pressure-Sensitive Adhesive

| 100 parts | Tuftec P 1500 | SBBS with 30% by weight block polystyrene content from Asahi. The SBBS contains about 68% by weight diblock content. |
| 100 parts | Escorez 5600 | hydrogenated HC resin with a softening point of 100° C., from Exxon |
| 25 parts | Ondina 917 | white oil comprising paraffinic and naphthenic fractions, from Shell |

The solvent used was a 2:1 mixture of toluene and acetone.

K2: Hotmelt Adhesive

| 100 parts | Kraton FG 1924 | maleic anhydride-modified SEBS with 13% by weight block polystyrene content, 36% by weight diblock and 1% by weight maleic acid, from Kraton |
| 25 parts | Escorez 5600 | hydrogenated HC resin (hydrocarbon resin) having a softening point of 100° C., from Exxon |
| 1 part | aluminium acetylacetonate | |

The solvent used was a 2:1 mixture of toluene and acetone.

K3: Radiation-Activatable Hotmelt Adhesive

| 25 parts | Epiclon 835 LV | bisphenol A and bisphenol F based epoxy resin from DIC, Japan, molecular weight $M_w$ about 350 g/mol |
| 25 parts | Epicote 1001 | bisphenol based epoxy resin from Mitsubishi Chemical Company, Japan, molecular weight $M_w$ about 900 g/mol |
| 50 parts | YP-70 | bisphenol A and bisphenol F based phenoxy resin from Nippon Steel Chemical Group, Japan, molecular weight $M_w$ about 55 000 g/mol |
| 1.5 parts | Irgacure 250 | iodonium salt-based UV photoinitiator from BASF (iodonium, (4-methylphenyl)[4-(2-methylpropyl) phenyl]-, hexafluorophosphate(1-)) |

The solvent used was methyl ethyl ketone.

K4: Heat-Activatable Adhesive

| 90 parts | Ultramid 1C | copolyamide 6/66/136 from BASF, having a viscosity number of 122 ml/g in 96% strength sulphuric acid in accordance with ISO 307 |
| 10 parts | EPR 166 | bisphenol based epoxy resin from Bakelite, epoxide number of 184 |
| 20 parts | PEG 2000 | polyethylene glycol with an average molar mass of 2000 |
| 20 parts | Foralyn 5040 | tackifier resin from Eastman |

The adhesive was prepared in a process as disclosed in DE102006047739 A1, using ethanol as solvent.

The layers of adhesive were stored for 72 hours at 23° C. and 50% relative atmospheric humidity (atmosphere A). The water content of the layers of adhesive was determined in each case before combination with the liner.

Measurement of the Water Content

The water content was determined in accordance with DIN 53715 (Karl-Fischer titration). Measurement took place on a Karl-Fischer Coulometer 851 in conjunction with an oven sampler (oven temperature 140° C.). A triple determination was carried out with an initial mass each time of around 0.3 g. The water content reported is the arithmetic mean of the measurements.

| Layer of adhesive | Water content [ppm] atmos. A |
| --- | --- |
| K1 | 853 |
| K2 | 551 |
| K3 | 3216 |
| K4 | 16400 |

Liner

Carrier Materials:

Carrier materials used for the liner were in one case a polyester carrier approximately 75 µm thick (Lumirror 60.01/75 from Toray Plastics, hereinafter: PET) and also a polyester film approximately 30 µm thick with an inorganic barrier layer coating (GX-P-F from Toppan Printing, hereinafter: barrier-PET).

Also prepared was a polyolefin-based film (PO), by flat-film coextrusion. This film consisted of a 50 µm base layer and a 10 µm outer layer. The base layer consisted of 91.3% (w/w) of polypropylene block copolymer Novolen 2309 L (BASF, melt index 6 g/10 min at 230° C. and 2.16 kg, ethylene content about 6.5% (w/w)), 8.4% (w/w) of titanium dioxide and 0.3% (w/w) of the HALS stabilizer Tinuvin 770.

The outer layer consisted of 85% of ethylene-multiblock copolymer Infuse D9107 (The Dow Chemical Company, d=0.866 g/cm3) and 15% of polyethylene LD251 (Exxon-Mobil, d=0.9155). The outer layer material and also the base layer was conveyed into the feed block of the coextrusion unit, with extrusion on an extrusion line from Dr. Collin.

Release Layers:

The outer layer of the abovementioned polyolefin film was also used as release layer (PO).

In the case of the silicone system used, the system in question is an addition-crosslinking silicone system from Wacker. 9.75 g of DEH 915 (a polydimethylsiloxane functionalized with vinyl groups) were mixed with 0.33 g of V24 (a methylhydrogenpolysiloxane) and 0.08 g of Kat OL (a platinum catalyst, also known under the name "Karstedt catalyst"). Beforehand, both raw materials had been dried by means of zeolite beads (Molecular Sieves 4 A from the supplier Sigma-Aldrich) at 23° C.

The release system was coated onto the carrier materials with a getter material layer, with the aforementioned release system formulation being applied via a laboratory coating unit. The coating weight was 2 g/m². After coating, the release systems were crosslinked in a forced-air oven at 160° C. for 30 seconds.

Getter Materials Used:

| Identification | Description | Trade Name | Supplier |
|---|---|---|---|
| G1 | calcium oxide | calcium oxide nanopowder | Sigma-Aldrich |
| G2 | lithium chloride | lithium chloride anhydrous | Sigma-Aldrich |
| G3 | calcium | high-purity calcium granules | Osnabruegge |
| G4 | zeolite 3A | Purmol 3 STH | Zeochem |

For application in thin layers, getter materials G2 and G4 were ground and screened where necessary so that there were no particles present which were larger than the layer thickness. After the grinding operation, these particles were regenerated by heat treatment in a manner known to the skilled person.

Production of the Liners:

The liners were produced in a glovebox under a nitrogen atmosphere at 23° C. at 1 ppm water content.

Liners with the pulverulent getter materials G1, G2 and G4 were produced by scattering an amount of approximately 2 g/m² onto the outer layer side of the polyolefin-based carrier film, using a sieve.

Then a second polyolefin-based carrier film was laminated by the base layer side onto the getter material layer by means of a heating press at 160° C.

Alternatively the getter material was consolidated in the outer layer by means of a laboratory laminating instrument with silicone rolls at a roll temperature of 160° C. A layer of the silicone release system was then applied as described above onto the getter material layer.

For adhesive tapes with calcium as the getter material, the metal was applied by vapour deposition under reduced pressure onto the PET film and onto the PET barrier film (in that case on the side bearing the inorganic barrier layer), producing in each case a getter material layer thickness of around 300 nm. Then a layer of the silicone release system was applied as described above onto the getter material layer.

Table 1 shows an overview of the liners produced which comprise layers of getter material:

TABLE 1

Getter material-filled liners

| Identification | Carrier material | Getter material layer | Getter amount [g/m²] | Release layer |
|---|---|---|---|---|
| L1 | PET | G3 | 0.47 | Silicone |
| L2 | Barrier PET | G3 | 0.47 | Silicone |
| L3 | PO | G1 | 1 | Silicone |
| L4 | PO | G2 | 1 | Silicone |
| L5 | PO | G4 | 1 | Silicone |
| L6 | PO | G1 | 1 | PO |
| L7 | PO | G2 | 1 | PO |
| L8 | PO | G4 | 1 | PO |
| L9 (comparative example) | PET | — | 0 | Silicone |

For further investigation, adhesive tape sections measuring approximately 100×100 mm² were conditioned as already described above and immediately thereafter were lined with the liner at 23° C. and 50% relative atmospheric humidity, using a laboratory laminator with a roll temperature of 80° C. The laminates produced in this way were stored under the following atmospheres for 168 hours:

Atmosphere B: 23° C., sealed in vacuumized packaging impervious to permeation

Atmosphere C: 23° C., 95% relative atmospheric humidity

Lastly, the water content of the adhesive was determined in the specimens. Here, samples were taken from the centre of the area of the specimen, in order to avoid margin effects. The results are summarized in Table 2:

TABLE 2

Determination of the water content

| Example | Liner | Adhesive | Assembly storage atmosphere | Water content of adhesives [ppm] after conditioning | after storage |
|---|---|---|---|---|---|
| 1 | L1 | K1 | atmos. B | 853 | 309 |
| 2 | L2 | K1 | atmos. B | 853 | 285 |
| 3 | L3 | K1 | atmos. B | 853 | 212 |
| 4 | L4 | K1 | atmos. B | 853 | 125 |
| 5 | L5 | K1 | atmos. B | 853 | 388 |
| 6 | L6 | K1 | atmos. B | 853 | 259 |
| 7 | L7 | K1 | atmos. B | 853 | 186 |
| 8 | L8 | K1 | atmos. B | 853 | 518 |
| 9 | L1 | K1 | atmos. C | 853 | 1180 |
| 10 | L2 | K1 | atmos. C | 853 | 491 |
| 11 | L3 | K1 | atmos. C | 853 | 1220 |
| 12 | L4 | K1 | atmos. C | 853 | 852 |
| 13 | L5 | K1 | atmos. C | 853 | 1160 |
| 14 | L6 | K1 | atmos. C | 853 | 1190 |
| 15 | L7 | K1 | atmos. C | 853 | 817 |
| 16 | L8 | K1 | atmos. C | 853 | 1290 |
| 17 | L1 | K2 | atmos. B | 551 | 208 |
| 18 | L2 | K2 | atmos. B | 551 | 133 |
| 19 | L3 | K2 | atmos. B | 551 | 95 |
| 20 | L6 | K2 | atmos. B | 551 | 136 |
| 21 | L1 | K2 | atmos. C | 551 | 803 |
| 22 | L2 | K2 | atmos. C | 551 | 263 |
| 23 | L3 | K2 | atmos. C | 551 | 806 |
| 24 | L6 | K2 | atmos. C | 551 | 785 |
| 25 | L1 | K3 | atmos. B | 3216 | 593 |
| 26 | L2 | K3 | atmos. B | 3216 | 459 |
| 27 | L3 | K3 | atmos. B | 3216 | 310 |
| 28 | L6 | K3 | atmos. B | 3216 | 382 |
| 29 | L1 | K3 | atmos. C | 3216 | 5200 |

TABLE 2-continued

Determination of the water content

| | Liner | Adhesive | Assembly storage atmosphere | Water content of adhesives [ppm] after conditioning | after storage |
|---|---|---|---|---|---|
| 30 | L2 | K3 | atmos. C | 3216 | 641 |
| 31 | L3 | K3 | atmos. C | 3216 | 4650 |
| 32 | L6 | K3 | atmos. C | 3216 | 4650 |
| 33 | L1 | K4 | atmos. B | 16400 | 3390 |
| 34 | L2 | K4 | atmos. B | 16400 | 2650 |
| 35 | L3 | K4 | atmos. B | 16400 | 1770 |
| 36 | L6 | K4 | atmos. B | 16400 | 1690 |
| 37 | L1 | K4 | atmos. C | 16400 | 34440 |
| 38 | L2 | K4 | atmos. C | 16400 | 5310 |
| 39 | L3 | K4 | atmos. C | 16400 | 31490 |
| 40 | L6 | K4 | atmos. C | 16400 | 34800 |
| Comparative examples | | | | | |
| C1 | L9 | K1 | atmos. B | 853 | 965 |
| C2 | L9 | K2 | atmos. B | 551 | 657 |
| C3 | L9 | K3 | atmos. B | 3216 | 3840 |
| C4 | L9 | K4 | atmos. B | 16400 | 16940 |
| C5 | L9 | K1 | atmos. C | 853 | 1337 |
| C6 | L9 | K2 | atmos. C | 551 | 894 |
| C7 | L9 | K3 | atmos. C | 3216 | 6882 |
| C8 | L9 | K4 | atmos. C | 16400 | 38700 |

The results show that liners of the invention are suitable for keeping permeates away from adhesive tapes or for limiting the amount of permeate that penetrates (Examples 9-16, 21-24, 29-32 and 37-40 in comparison to the Comparative Examples C5-C8).

It is particularly advantageous for the liner to comprise a barrier layer against one or more permeates or for the carrier material itself to exhibit a strong barrier effect against the permeate (L2), since then the getter capacity is sufficient not only to scavenge the entire amount of the permeate to which it is exposed, but also, furthermore, to reduce the amount of permeate already present in the adhesive (Examples 10, 22, 30, 38).

The surprisingly good suitability of the liners of the invention for removing permeates from adhesive tapes is also shown by Examples 1-8, 17-20, 25-28 and 33-36.

We claim:

1. A release liner for the protection of adhesive, the release liner comprising a first layer contacting a second layer, wherein the first layer of the release liner is an adhesive release layer and the second layer of the release liner is a layer of a getter material capable of sorbing at least one permeable substance, wherein the getter material is selected from the group consisting of calcium oxide, boron trioxide, sodium sulfate, potassium carbonate, copper sulfate, magnesium perchlorate, magnesium sulfate, zeolites and mixtures thereof.

2. The release liner according to claim 1, wherein the release liner comprises at least one third layer that is a carrier layer.

3. The release liner according to claim 1, wherein the release liner comprises a barrier layer against one or more specific permeates.

4. The release liner according to claim 1, wherein the getter material binds a permeate by chemisorption.

5. The release liner according to claim 1, wherein the layer of getter material is porous and/or foamed.

6. The release liner according to claim 1, wherein the release liner consists of a third layer that is a carrier layer, the adhesive release layer and the layer of the getter material capable of sorbing at least one permeable substance.

7. An adhesive covered at least on one side and at least partially with the release liner according to claim 1.

8. The adhesive according to claim 7, wherein the adhesive before being contacted with the release liner has a permeate content of less than 1000 ppm.

9. A method comprising:
   providing an adhesive tape that is at least partially covered on at least one side with a release liner comprising (i) at least one adhesive release layer and (ii) at least one layer of a getter material capable of sorbing at least one permeable substance, wherein the getter material is selected from the group consisting of calcium oxide, boron trioxide, sodium sulfate, potassium carbonate, copper sulfate, magnesium perchlorate, magnesium sulfate, zeolites and mixtures thereof; and
   encapsulating optoelectronic arrangements with the adhesive tape.

* * * * *